H. E. BABIONE.
CORN RACK.
APPLICATION FILED JUNE 17, 1915.
1,210,258.
Patented Dec. 26, 1916.
2 SHEETS—SHEET 2.
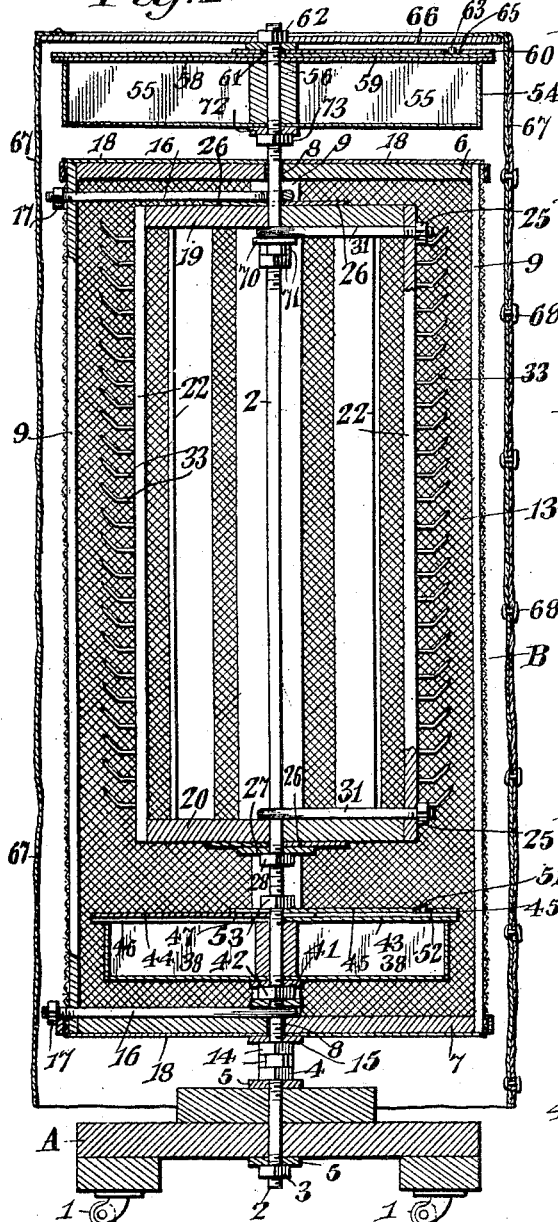
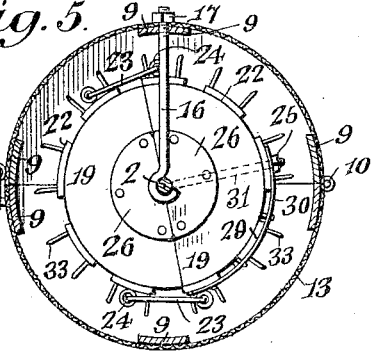
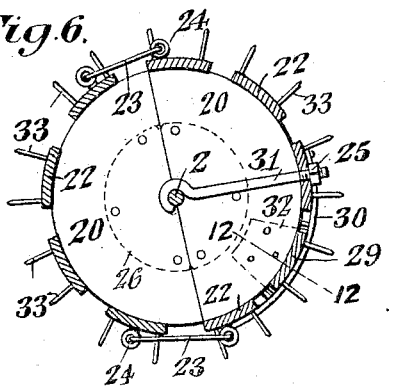
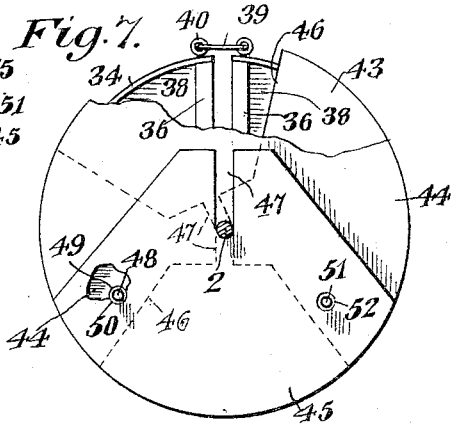
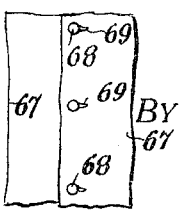
WITNESSES:
Harry E. Babione, INVENTOR
BY
Attorney ically rigid

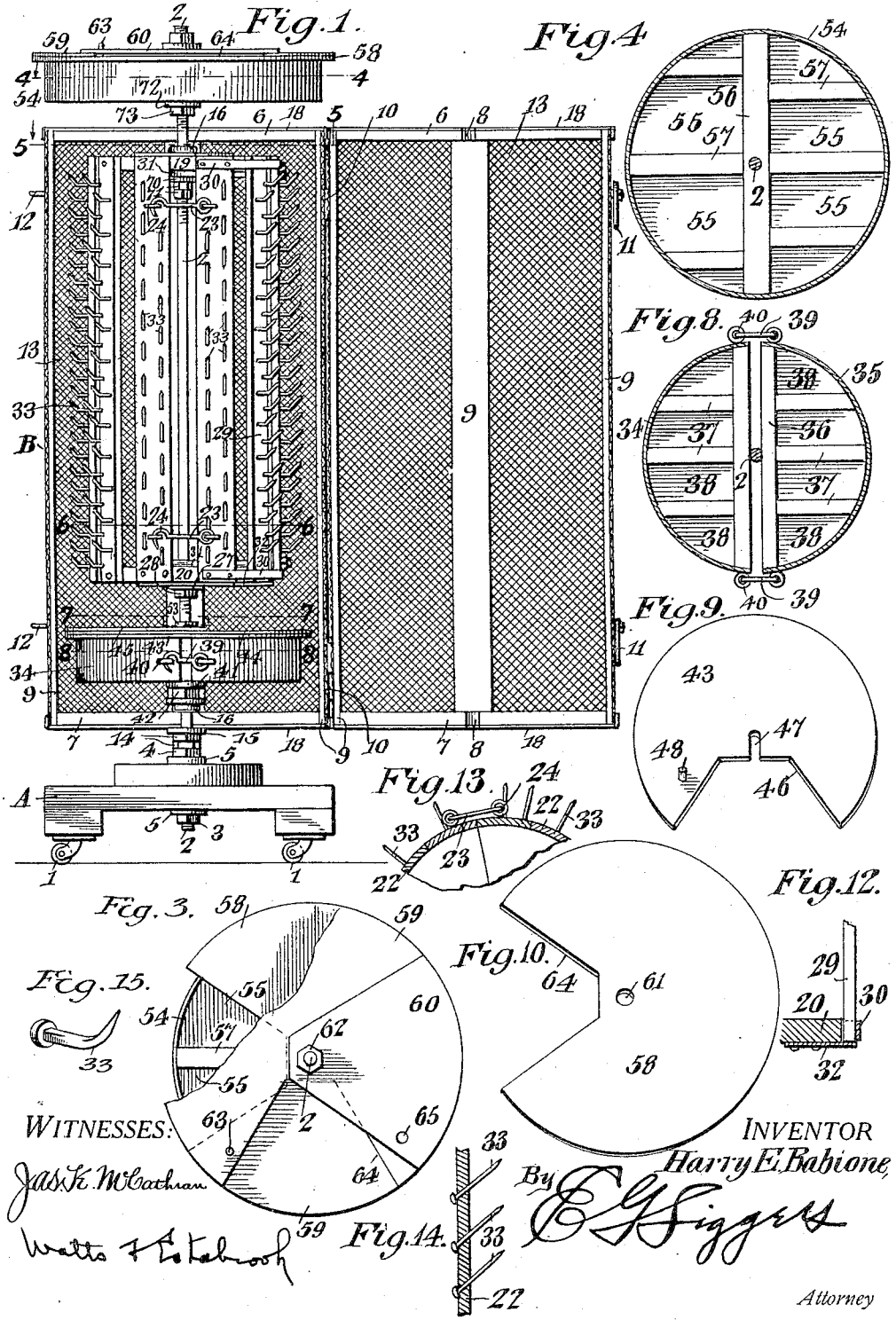

UNITED STATES PATENT OFFICE.

HARRY EDWARD BABIONE, OF WOODVILLE, OHIO.

CORN-RACK.

1,210,258.  Specification of Letters Patent.  Patented Dec. 26, 1916.

Application filed June 17, 1915.   Serial No. 34,695.

*To all whom it may concern:*

Be it known that I, HARRY E. BABIONE, a citizen of the United States, residing at Woodville, in the county of Sandusky and State of Ohio, have invented a new and useful Corn-Rack, of which the following is a specification.

This invention relates to an improvement in corn racks, and the object is to provide a receptacle in which a rotary rack may be mounted, upon which ears of corn can be suspended for the purpose of thoroughly drying the corn, and protecting the corn from rats, mice, squirrels, chickens and the like.

A further object is in the provision of a plurality of receptacles, or containers, which are mounted upon a shaft and capable of rotary movement independent of each other.

The invention consists of certain novel features of construction and combinations of parts, which will be hereinafter described and pointed out in the claims.

It will be evident that many slight changes may be made in the form and arrangement of the several parts to be described without departing from the spirit and scope of the invention, and hence I do not wish to be limited to the exact construction herein set forth.

In the accompanying drawings,—Figure 1 is a view in elevation of the invention, showing the outer or protecting cylinder in open position. Fig. 2 is a vertical sectional view of the invention. Fig. 3 is a view in top plan of the seed pan, disclosing a portion of the cover broken away to more clearly disclose the relation of the several sections of the cover. Fig. 4 is a horizontal sectional view on the line 4—4 of Fig. 1. Fig. 5 is a horizontal sectional view on the line 5—5 of Fig. 1. Fig. 6 is a horizontal sectional view on the line 6—6 of Fig. 1. Fig. 7 is a horizontal sectional view on the line 7—7 of Fig. 1. Fig. 8 is a horizontal sectional view on the line 8—8 of Fig. 1. Fig. 9 is a perspective view of one of the sections of the cover of the lower seed pan. Fig. 10 is a perspective view of one of the sections of the upper seed pan or receptacle. Fig. 11 is a detail view in elevation showing the manner of fastening the edges of the curtain or cover. Fig. 12 is a detail sectional view on the line 12—12 of Fig. 6. Fig. 13 is a detail sectional view showing the slats of the corn rack arranged contiguously. Fig. 14 is a detail sectional view showing inclined prongs.

A represents the base which may be of any suitable construction, and 1 represents casters or wheels mounted upon the base. Connected to the base A is a shaft 2, which may be of any suitable construction and material. The shaft is connected to the base by means of nuts 3 and 4, which have screw threaded engagement with the shaft. Washers 5 are interposed between the base and the nuts, so that as the two nuts 3 and 4 are screwed upon the shaft, the base will be clamped therebetween, and the shaft rigidly supported by the base.

An outer or protecting cylinder B is mounted on the shaft 2. The upper and lower ends 6 and 7 of the cylinder are made in sections, and each section is provided with a recess 8 which is fitted around the shaft 2. Bars 9 connect the upper and lower ends together. Two of the adjacent bars 9 are connected together by means of pin hinges 10, for hinging the two sections of the cylinder together. Hooks 11 are connected to the slats 9 and eyes 12 are connected to the slats 9, so that when the two sections are drawn together, the hooks 11 can be inserted in the eyes 12 for fastening the sections of the cylinder together.

A wire netting or covering 13 is applied to the slats 9 for producing a closure to prevent animals and birds, such as rats, mice, chickens and the like, from obtaining access to the cylinder. Nuts 14 are screwed upon the shaft 2, and a washer 15 is mounted thereon for forming a bearing for the base or lower end 7 of the outer cylinder. The cylinder is fastened to the shaft 2 by means of hook bolts 16, which engage the shaft and pass through one of the bars 9, and are fastened thereto by means of nuts 17, which securely locks the cylinder to the shaft and affords a support for the cylinder upon the shaft. These hook bolts 16 are located at both ends of the cylinder, and they form a bearing in connection with the shaft 2 for the outer cylinder when stationary or in motion. The outer surfaces of the ends 6 and 7 are covered with layers of metal plates 18, forming a protection against moisture and preventing animals from gnawing through the ends.

A corn rack is mounted within the cylinder consisting of sectional heads 19 and 20. These heads are connected together by a plurality of slats 22. Connected to one of the slats 22 of one of the sections are hooks 23, and eyes 24 are connected to a slat 22 of the other section in which hooks 23 are received, for maintaining the sections together. Connected to a slat 22 of one of the sections of the rack are hook bolts 31. These hook bolts are located at each end of the rack and along the inner surfaces of the heads 19 and 20. Nuts 25 are screwed upon the terminals of the hook bolts for fastening them to the slat. The hook bolts 31 engage the shaft 2 for supporting the corn rack upon the shaft, and form bearings for the rack.

Wear plates 26 are applied to the heads 19 and 20 for protecting the heads. The wear plates 26 of the heads 19 engage the hook bolt 16, which is located beneath the end 6 of the cylinder, and the wear plates on the heads 20 are engaged by a washer 27, which is mounted upon the shaft 2 and held thereagainst by a nut 28.

A slat 29 is removably supported upon the heads 19 and 20, by means of straps 30 connected to the slats 22. A plate 32 is connected to one of the sections of the head 20 for supporting the lower end of the slat 29. This removable slat 29 affords means of access to the interior of the corn rack, so that corn and the like can be inserted within the rack.

The slats 22 and 29 are provided with a plurality of prongs 33, which are preferably arranged in a zig-zag manner. The inner terminals of the prongs are, preferably, made square, so that they will be held rigidly to the slats and held against rotation. The outer terminals of the prongs project upwardly and mounted upon these prongs are ears of corn which are allowed to dry. This corn, which is supported by the slats, is generally used for seed corn, and the slats may be painted in various colors and each prong numbered so that it will be possible to determine the grade and quality of the corn of each ear. This inner cylindrical body is hollow; carries a relatively large number of closely nested ears of corn against its outer peripheral face; is hollow for the reception of corn seed, and the like; and has a removable panel or slat in its side admitting access to the interior of the body; and which may be easily and quickly detached and secured back in place. The peculiar shape and arrangement of the prongs 33 admits of the placing of a very large number of the prongs on the body, and the peculiar formation of the shank or inner ends of the prongs prevents their twisting or turning downwardly or laterally, so as to positively hold the ears of corn in their upwardly inclined position at all times.

Mounted upon the shaft 2, below the head 20, of the corn rack, is a seed pan consisting of two sections 34 and 35. These sections are preferably made of metal and are provided with longitudinal strips 36 along their inner edges, which may be of wood. Connecting the outer wall of each of the sections of the pan to the longitudinal strips 36 are transverse strips 37, for forming pockets or compartments 38, in which various seeds can be deposited and protected. These sections 34 and 35 are connected together by hooks 39 and eyes 40. The hooks 39 are adapted to engage the eyes 40 for locking the two sections together. The shaft 2 is received between the longitudinal strips 36. The pan is supported upon the shaft 2 by means of a washer 41 and nut 42 mounted upon the shaft. A cover is mounted upon the pan, and is composed of three sections 43, 44 and 45. The sections 43 and 44 are provided with practically U-shaped recesses 46, and are provided with a slot or notch 47, in which is received the shaft 2 for fastening the sections upon the shaft and forming a bearing for them during their rotary movement.

The lower section 43 is provided with a pin 48, which passes through a hole 49 in section 44, and a hole 50 in section 45. The section 44 is provided with a pin 51, which enters an opening 52 in the section 45 for locking the three sections together. The uppermost section 45 forms a covering for the recesses of the sections 43 and 44. When it is desired to operate the sections 43 and 44, so that access may be had to a compartment of the pan, the section 45 is removed, and the sections 43 and 44 will be free to move, causing the recesses 46 in the sections 43 and 44 to be brought into registry with a compartment or chamber of the pan.

A nut 53 is mounted upon the shaft 2 for maintaining the sections of the cover in place. An upper seed receptacle having a body 54 is preferably made of metal, and is provided with a plurality of compartments 55, formed by a longitudinal bar 56 and transverse strips 57. The shaft 2 extends through the bottom of the body 54 and longitudinal bar 56. A metal cover is mounted upon the receptacle 54, and is composed of three sections 58, 59 and 60. The bottom section 58 and the intermediate section 59 are each provided with U-shaped recesses 64, and each of the sections are provided with an opening 61 through which the shaft 2 extends for supporting the several sections upon the receptacle.

A nut 62 is screwed upon the shaft for maintaining the several sections in position. The intermediate section 59 is provided with a pin 63, which is adapted to enter an opening 65 in the section 60, for locking said section over the recess 64 of the intermediate section 59. A disk 66 is mounted upon the shaft 2 above the body 54 of the upper receptacle, and is provided with a covering of canvas 67, or other suitable material, which entirely incloses the cylinder, corn rack and receptacle so that they are protected against moisture and dust.

The metal covering applied to the upper and lower receptacles, and to the cylinder, protects the contents of the receptacles and cylinder against moisture and prevents rats, mice and birds from obtaining access to the contents. The edges of the covering 67 are fastened together by means of buttons 68 passing through buttonholes 69, although any other suitable method of fastening may be employed, and, if desired, the edges of the covering may be fastened securely together.

A washer 70 and nuts 71 are connected to the upper terminal of the shaft 2, for the purpose of supporting the seed pan, and when supported in this manner the corn rack is lowered upon the shaft, and the seed pan or lower receptacle is supported above it and, in some instances, the seed pan can be inserted within the corn rack. The upper receptacle 54 can be readily removed from the shaft 2 by removing the nut 62. The receptacle 54 is supported upon the shaft by means of a washer 72 and nut 73, which engage the lower surface of the receptacle. The corn rack and cylinder can be disengaged from the shaft 2, by releasing the bolt hooks 16 and 31, and the sections of the cylinder are released upon the removal of the hooks 11 from engagement with the eye 12. When the hooks 23 are released from engagement with the eyes 24 of the corn rack, the two sections of the corn rack can be removed.

The lowermost seed pan can be removed from the shaft, by simply disengaging the hooks 39 from the eyes 40. It will, therefore, be seen that the several receptacles can be quickly removed from and applied to the shaft 2. The shaft 2 is stationary, but each of the receptacles supported upon the shaft are capable of an independent rotation. The compartments of the upper and lower receptacles are for the purpose of receiving seeds of various kinds, for instance, the lower receptacle could be used for garden seeds and the upper receptacle for shell corn.

By arranging the prongs 33 in a zig-zag fashion it is possible to place a greater number of ears of seed corn upon the slats. These racks will support from 400 to 500 ears of corn and the outside protecting cylinder is of sufficient diameter to prevent the wall of the cylinder from coming in contact with the ears of corn.

In some instances it may be found unnecessary to use the covering 67, and even the protecting cylinder B, or either or both of the seed receptacles. Whenever this is desirable the various parts can be quickly and easily removed from the shaft without disturbing the other parts. The corn rack and lower seed receptacle can be disconnected from the shaft without removing the outer cylinder. It is therefore possible, with a construction of this character, to arrange the several parts with respect to each other so that they can be packed in a small compass for shipment, and can be readily assembled when desired.

While I have stated that the prongs are located in a zig-zag fashion, it might be found advisable in some instances to arrange them otherwise. If desired, the shape of the prongs may be changed, and hence I do not wish to be limited to the exact construction and arrangement of the various parts described.

What is claimed is:—

1. The combination with a shaft, of a corn rack, and hook bolts carried by the corn rack and engaging the shaft to detachably support the corn rack thereon.

2. The combination with a shaft, of a sectional corn rack, means for securing the sections together, and supporting means on one of the sections and engaging the shaft to support the entire corn rack thereon.

3. The combination with a shaft, of a cylinder, and hook bolts carried by the cylinder and engaging the shaft to detachably support the cylinder thereon.

4. The combination with a shaft, of a sectional cylinder, means for securing the sections of the cylinder together, and supporting means on one of said sections and engaging the shaft to support the entire cylinder thereon.

5. The combination with a shaft, of an inclosing cylinder mounted on the shaft, a sectional corn rack adapted to be assembled within the cylinder about the shaft, and detachable securing means carried by the corn rack and engaging the shaft to support the corn rack therein independently of and within the cylinder.

6. The combination with a shaft, of a cylinder mounted on the shaft, and a sectional corn rack engaging about the shaft within the cylinder, and hook bolts detachably mounted on the corn rack for engagement with the shaft and adapted to be tightened to bind the corn rack thereto, said sectional corn rack and said hook bolts being adapted to be removed from the shaft and the cylinder without disturbing the adjustment of the cylinder on the shaft.

7. The combination with a shaft, of a corn rack mounted on the shaft, a sectional cylinder engaging the shaft and inclosing the corn rack, and detachable fastening means carried by the cylinder for engagement with the shaft to hold the cylinder thereto, said sectional cylinder and said detachable fastening means being adapted to be removed from the shaft and from about the corn rack without disturbing the adjustment of the corn rack on the shaft.

8. The combination with a shaft, of a sectional corn rack surrounding the shaft, a sectional cylinder surrounding the shaft and inclosing the corn rack, and independent fastening means on the corn rack and on the cylinder for engagement with the shaft to secure the corn rack and the cylinder thereto, said sectional corn rack and said sectional cylinder being adapted to be independently placed on and removed from the shaft without disturbing the adjustment of each other on the shaft.

9. The combination with a shaft, of a sectional corn rack, means for hingedly connecting the sections of the rack together, and fastening means between one of the sections and the shaft to secure the sections thereto, the other section being adapted to be swung into open position to permit access to the interior of the corn rack.

10. The combination with a shaft, of a cylinder composed of separate sections, fastening means securing one of said sections to the shaft, and a hinged connection between said secured section and the other section to permit of the outward swinging of the latter to gain access to the interior of the cylinder.

11. The combination with a shaft, of a cylinder on the shaft, a sectional corn rack assembled within the cylinder about the shaft, a sectional seed receptacle assembled within the cylinder about the shaft, independent detachable fastening means for the corn rack and the seed receptacle and for engagement with the shaft to hold the same thereon, said sectional corn rack and said sectional seed receptacle being adapted for independent positioning in and removal from the cylinder, and for independent securing upon and detachment from the shaft without disturbing the adjustment of each other and of the cylinder on the shaft.

12. The combination with a shaft, of a sectional cylinder, a sectional corn rack mounted in the cylinder, a sectional seed receptacle arranged in the cylinder, and independent detachable fastening means carried by the cylinder and the corn rack and the seed receptacle for engagement with the shaft to support all of said members thereon, the members being adapted to be independently removed from the shaft without disturbing the adjustment of each other on the shaft.

13. The combination with a shaft, of a sectional corn rack composed of sectional heads and slats secured to the head sections, means for connecting the sections together, supporting means connecting one of the sections to the shaft, and a plurality of outstanding prongs mounted on the slats for supporting corn.

14. The combination with a shaft, of a corn rack composed of spaced apart sectional heads, a plurality of slats connecting the corresponding sections of the heads to provide a sectional body, hooks detachably engaging the slats of the opposed sections for holding the sections about said shaft, and hook bolts carried by a slat of one of said body sections and extending inwardly and engaging the shaft, said hook bolts lying flat against the inner faces of said heads to firmly brace the corn rack on the shaft and admit of the free turning of the corn rack on the shaft.

15. The combination with a shaft, of a cylinder composed of spaced apart sectional heads, a plurality of slats connecting the corresponding sections of the heads to provide body sections, hooks detachably engaging the slats of the opposed body sections for holding the same about said shaft, and hook bolts carried by a slat of one of said body sections, and extending inwardly and engaging the shaft, said hook bolts lying flat against the inner face of said heads to firmly brace the cylinder on the shaft and admit the free turning of the cylinder on the shaft.

16. The combination with a shaft, of a sectional cylinder consisting of sectional ends and bars, said ends and bars being connected together, means for pivotally connecting the sections together, means for fastening the two sections in closed position, and hook bolts engaging the shaft and being connected to one of the bars of one of the sections for supporting the cylinder upon the shaft, and a covering connected to the ends and bars of each section.

17. A device as specified, comprising a base, a shaft rising from the base, a corn rack rotatably mounted on the shaft, seed receptacles rotatably mounted on the shaft independently of the corn rack, and an inclosing cylinder surrounding the rack and the seed receptacles.

18. A device as specified, comprising a base, a shaft rising from the base, a rack on the shaft, a lower seed receptacle on the shaft beneath the rack, a cylinder inclosing the rack and the lower seed receptacle to protect the same, an upper receptacle above the cylinder and exterior thereof, a disk on the upper end of said shaft, and a covering carried by said disk depending about said upper seed receptacle and said cylinder to entirely inclose the device.

19. The combination with a shaft, of a sectional corn rack consisting of sectional heads and slats, said heads and slats being connected together, means for connecting the sections together, a slat of one of the sections capable of being removed, straps connected to said section for maintaining the removable slat in position, and a plate connected to one of the heads for supporting the movable slat.

20. In combination with a shaft, a seed receptacle mounted on the upper end of the shaft, a sectional cylinder assembled about the shaft below the seed receptacle, a sectional corn rack fitted within the cylinder about the shaft, a sectional seed receptacle secured within the cylinder about the shaft, and a hood mounted on the upper end of the shaft independently of all of said members to cover the same and being adapted to permit of the free and independent adjustment and removal of each one of the members relatively to the shaft.

21. In a corn rack, a hollow body comprising an annular wall, upper and lower heads closing the ends of the body, prongs outstanding from the body, a removable slat in one side of the body, a plate on the lower head for engagement with the removable slat, and straps carried by the body and engaging the removable slat to detachably hold the same in position.

22. In a corn rack, a cylindrical body, comprising a pair of spaced apart heads, slats fixed at their opposite ends to the heads, prongs outstanding from the slats, a plate carried by the lower head, a slat resting on the plate and being removable for gaining access to the interior of the cylindrical body, and straps carried by the fixed slats and engaging the removable slat to detachably hold the same in position.

23. In a corn rack, a plurality of circularly arranged slats, and a plurality of prongs mounted on the slats in a zigzag manner, and having inner ends of angular cross section for engagement in the slats to retain the prongs from twisting, the outer ends of the prongs projecting upwardly to support the ears of corn to be dried.

24. In a corn rack, a cylindrical body, and a plurality of prongs projecting outwardly from the sides of the body and having angularly faced inner ends binding in the said sides to hold the prongs from turning, said prongs being arranged in zigzag relation about the body to admit the positioning of a relatively large number of prongs on the outer surface of the body, the prongs also being turned upwardly at their outer extremities to support the ears of corn in an upwardly inclined position about the body.

25. The combination with a shaft, of an inclosing cylinder mounted for rotation on the shaft, and having a hinged section at one side adapted to permit of access to the interior of the cylinder, and a corn rack rotatably mounted on the shaft within the cylinder and adapted to be turned to permit access to any desired side thereof through the open side of said cylinder irrespective of the position of the same.

In testimony, that I claim the foregoing as my own I have hereto affixed my signature in the presence of two witnesses.

HARRY EDWARD BABIONE.

Witnesses:
JNO. F. NIEMAN,
CHAS. A. SUHLMAN.

Copies of this patent may be obtained for five cents each, by addressing the "Commissioner of Patents, Washington, D. C."